United States Patent

Lin et al.

[11] Patent Number: 6,154,468
[45] Date of Patent: *Nov. 28, 2000

[54] FAST SYNC-BYTE SEARCH SCHEME FOR PACKET FRAMING

[75] Inventors: Chin-Sung Lin, Flushing; Samuel O. Akiwumi-Assani, Beacon, both of N.Y.; Sanand Prasad, Dallas, Tex.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,988

[22] Filed: Oct. 24, 1996

[51] Int. Cl.[7] .................................................. H04J 3/06
[52] U.S. Cl. ......................... 370/510; 375/365; 370/514
[58] Field of Search .................................. 375/346, 344, 375/395, 224, 363, 365, 360, 369; 370/514, 520, 503, 509, 504, 506, 510; 364/728.03; 371/42, 47.1, 22.36, 27.7

[56] References Cited

U.S. PATENT DOCUMENTS

| | | |
|---|---|---|
| 4,963,868 | 10/1990 | Takayama et al. ..................... 341/72 |
| 5,123,013 | 6/1992 | Hirayama ............................... 370/514 |
| 5,128,945 | 7/1992 | Enns et al. ............................. 370/514 |
| 5,181,229 | 1/1993 | Langlais et al. ....................... 375/114 |
| 5,406,569 | 4/1995 | Isozaki ..................................... 371/42 |
| 5,625,654 | 4/1997 | Pinier et al. .......................... 370/514 |
| 5,671,227 | 9/1997 | Keller et al. .......................... 370/509 |
| 5,673,296 | 9/1997 | Ohgane ................................. 375/368 |
| 5,703,887 | 12/1997 | Heegard et al. ........................ 371/42 |
| 5,715,278 | 2/1998 | Croft et al. ............................ 375/224 |

OTHER PUBLICATIONS

PHA 23, 138, U.S. Serial No. 08/679,031, Filed Jul. 12, 1996.

*Primary Examiner*—Chau Nguyen
*Assistant Examiner*—Chiho Andrew Lee
*Attorney, Agent, or Firm*—Laurie E. Gathman

[57] ABSTRACT

A device and method for synchronizing a series of data packets in a bitstream using a histogram which accumulates a count of occurrences of a particular synchronization pattern at a given location in each packet and identifies the start of a data packet based on the count of such occurrences stored in the histogram.

27 Claims, 10 Drawing Sheets

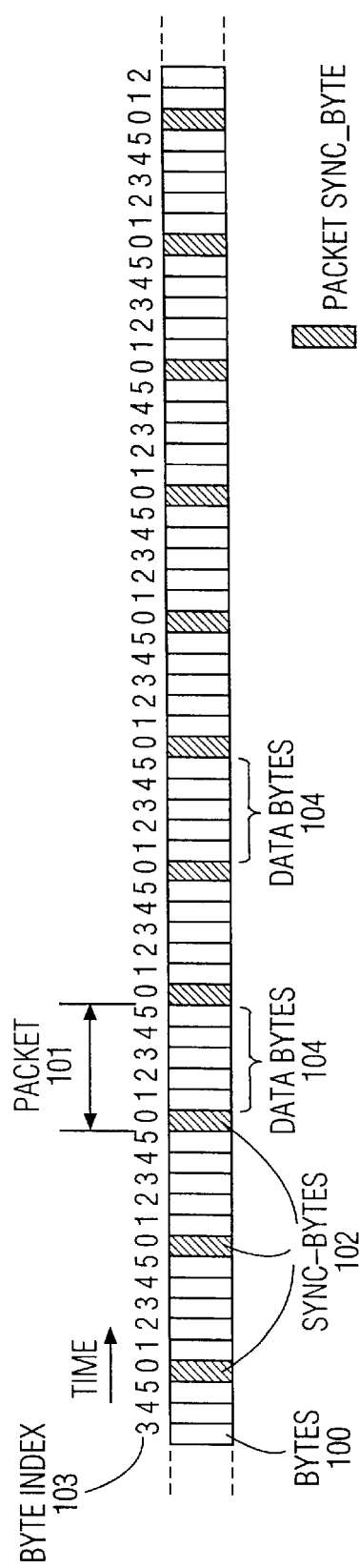
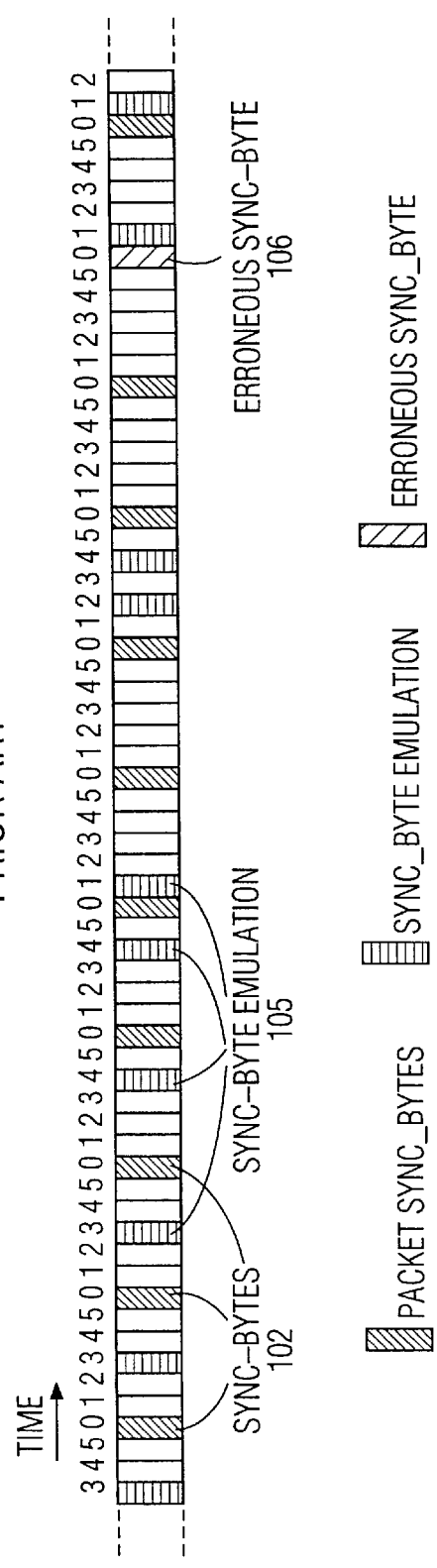

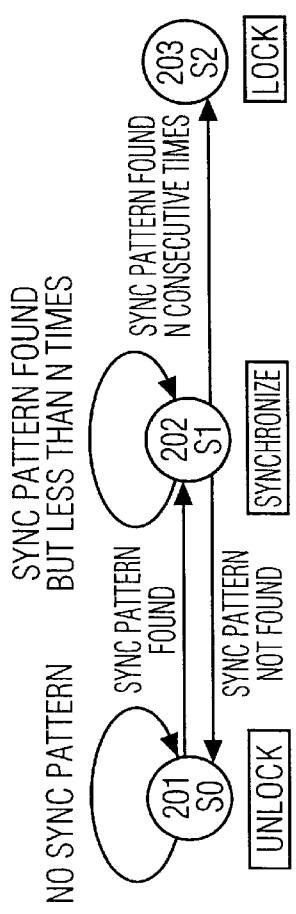
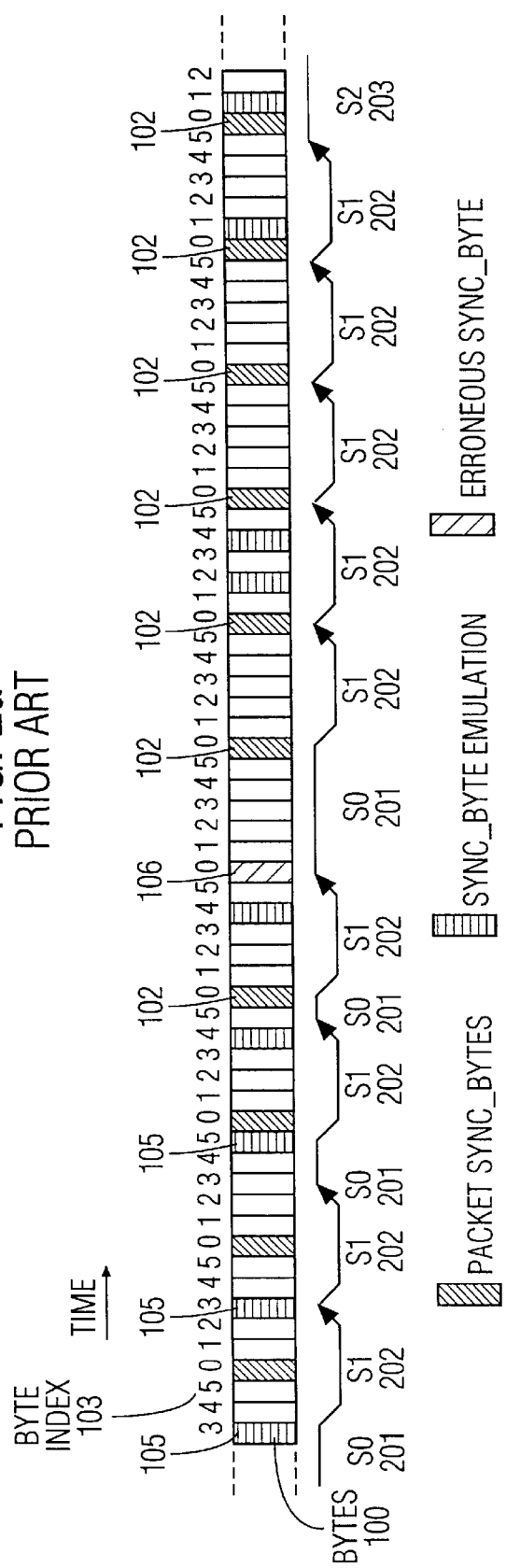
FIG. 2a
PRIOR ART
FIG. 2b
PRIOR ART

FAST SYNC-BYTE SEARCH SCHEME FOR PACKET FRAMING

TECHNICAL FIELD

This invention relates to the field of computer communications, and in particular, to the area of detecting the start of a packet within a bitstream.

BACKGROUND OF THE INVENTION

Packets in a bitstream are often delineated by the appearance therein of a particular data value, e.g., a particular 8 bit wide (byte or octet) data pattern, which may be termed the "synchronization pattern". When explicit framing signals are not received along with the bitstream, the equipment receiving the bitstream can use the synchronization pattern to identify the start of a packet. Doing so, however, is complicated when the particular data value employed as the synchronization pattern can appear elsewhere within the bits that make up the rest of a packet. Such an appearance may occur a) when the value of the synchronization pattern is not reserved solely for identifying the start of a packet, b) when the bitstream does not have any predefined bit group, e.g., byte alignment, or c) when errors occur in the bitstream. The synchronization process is further complicated by the possibility of the pattern not being received, for example when noise corrupts the signal when the synchronization pattern is being sent.

The "Motion Pictures Expert Group-2" (MPEG-2) international standard, ISO/IEC 13818-1, is an implementation of such a synchronization scheme. Each MPEG-2 transport bitstream packet has a length of 188 bytes, the first of which is the sync-byte, which contains the sync-pattern. The data value used for the sync-pattern is 0×47. Thus, a sync-byte, with value of 0×47, should appear in the bitstream every 188 bytes. The sync-pattern value, 0×47, is not reserved exclusively for the sync-byte, and other bytes within the bitstream may contain this value as well.

According to one prior art technique, each 8 bit pattern of an MPEG-2 bitstream is tested to determine if it is a sync-byte. When a tested group of eight bits matches the sync-pattern, the next 187 eight bit groups are counted as they pass, but they are not tested. Then, the 189th byte is tested to determine if it is also contains the sync-pattern. If so, it is determined that the preceding 188 bytes, i.e., the first found sync-pattern and the counted 187 eight bit groups, were likely to have been a packet. The process is then repeated several (N) times to minimize the chance that the detection of sync-patterns spaced apart by the length of one packet is the result of chance; i.e., that bytes containing the sync-pattern randomly appeared in the bitstream at the correct packet length interval, but were not the actual packet delineating sync-bytes. If ever the 189th 8 bit pattern does not conform to the sync-pattern, the process is restarted.

The appearance in the bitstream of the sync-pattern at a position other than the position of the sync byte is referred to as "sync-byte emulation". In a typical system, the threshold number of sequential occurrences of the sync-pattern at each packet interval, N, may range from 10 to 100, depending upon the likelihood of sync byte emulation, and the degree of confidence required that the correct determination has been made. The likelihood of sync byte emulation is a function of the value chosen as the sync pattern. In formulating a format for a communication system, if the data content has a predictable frequency of occurrence distribution, the least likely to occur data pattern is chosen as the synchronization pattern. In a worst case scenario, wherein the data content is random and uniformly distributed, any pattern may be selected and the likelihood of the synchronization pattern appearing in a data byte would be one out of the total number of possible data patterns. In such a scenario, the likelihood of N sequential occurrences of sync-byte emulation, i.e. the likelihood of erroneously declaring that synchronization has been achieved, is one out of the total number of possible data patterns raised to the Nth power. A relatively small value of N can result in a very high degree of confidence in the result. Even with a small N, however, the prior art technique cannot be guaranteed to achieve synchronization in a finite period of time.

In applications where there is sync-byte emulation, the prior art technique may be slow to determine that a packet has been received. And, in the presence of noise or other factors which cause the true sync-byte to contain a value other than the sync-pattern, the process is restarted, further delaying the establishment of synchronization. During this period of synchronization to determine the true start of a packet, the data within the packets are lost. This loss of time, and data, is incurred each time the system undergoes the synchronization process: during the initial establishment of communication, and after each loss of synchronization caused by noise or other sources of errors.

SUMMARY OF THE INVENTION

In accordance with the principles of the invention, packets are delineated by a) developing a histogram representing the occurrence of the synchronization pattern at each possible location within a packet length, and b) determining that the true start of the packet is to be found at the location with the greatest number of occurrences of the sync pattern, as indicated by the histogram.

In an exemplary embodiment of the invention, a "match" table is used which has one entry for each possible starting location for the packet. Each possible starting location corresponds to a unit of data which can be compared to the synchronization pattern. That is, the size of the match table will be equal to the number of "compare units" per packet. The entries of the match table are initially set to zero. The table is addressed by a modulo counter having a modulus equal to the size of the match table. The modulo counter is incremented each time a new compare unit is received.

Each time a compare unit is received which matches the synchronization pattern, the corresponding entry of the match table, as addressed by the modulo counter, is incremented. If the compare unit doesn't match the synchronization pattern, any one of several strategies may be undertaken; for example, the entry of the match table addressed by the modulo counter may be reset to zero, it may be left as is, or it may be decremented.

The packet delineation process is completed when the value of one of the entries of the match table is large enough to conclude that it is the true location of the start of packet. In the exemplary embodiment, this conclusion is reached when the entry is equal to N, the threshold value chosen to minimize the possibility of N occurrences of the synchronization pattern at a location other than the true sync-byte location before N occurrences of the synchronization pattern at the true sync byte location.

Advantageously, through the use of this invention, the synchronization time can be made to be no more than N packet intervals. As will be shown, alternative algorithms can be employed in accordance with this invention which have the possibility of achieving synchronization in less than N packet intervals. Also, since the process accumulates information about all possible starting locations simultaneously with each occurrence of a packet, it can be employed whenever loss of synchronization is suspected, thereby saving time once the determination is made that resynchronization is required.

BRIEF DESCRIPTION OF THE DRAWING

In the drawing:

FIG. 1 shows a sync-byte framed bitstream, and a sync-byte framed bitstream with sync-byte emulation and erroneous sync-bytes.

FIG. 2 shows a state diagram and timing diagram for the traditional method of delineating the true sync-byte start of each packet.

DETAILED DESCRIPTION

Figure 3:
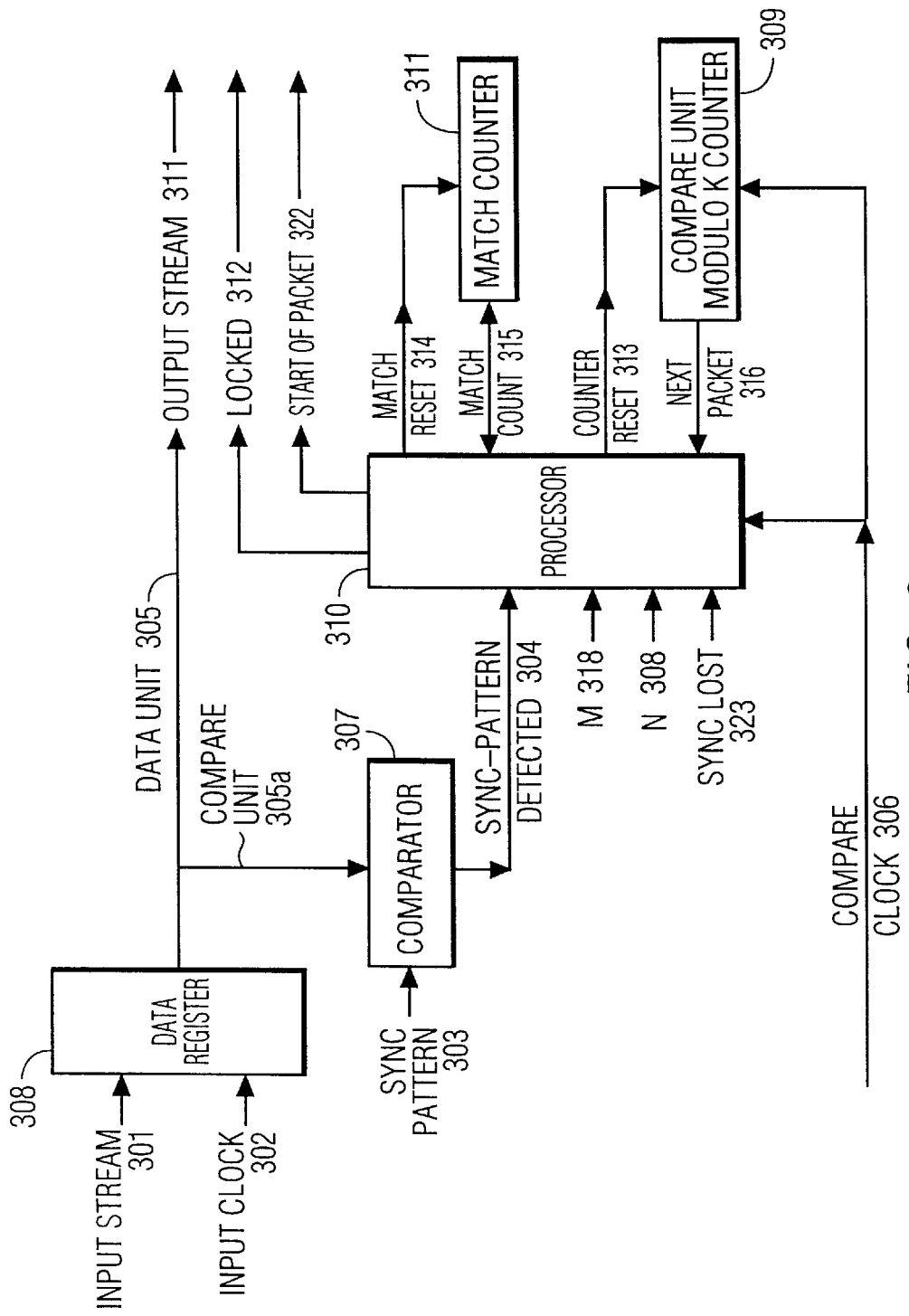
FIG. 3 shows a block diagram of the traditional method of delineating the true sync-byte start of each packet.

A packet framing method in accordance to this invention may be employed in system wherein the compare unit is a byte. The use of this packet framing method in such a system is described by way of example, for ease of understanding.

FIG. 1a shows an exemplary sync-byte framed bitstream. The bitstream is delineated by bytes 100. A fixed number of bytes forms a packet 101. In this example, a packet 101 contains six bytes, the first of which 102 is a sync-byte. The bytes in each packet are referred to and indexed by the order in which they appear, in time, in the packet, starting at 0. Byte-0 is the first byte, byte-1 is the second byte, and so on. FIG. 1a shows the byte index 103 for each byte in the bitstream. As shown in FIG. 1a, each byte-0 in this exemplary bitstream is a sync-byte; all other bytes in the bitstream are data-bytes 104.

The sync-byte contains a specified pattern of bits, termed a sync-pattern. When a data-byte contains the same bit pattern as the sync-pattern, the data-byte is said to be emulating the sync-byte. Such emulation can occur if the sync-pattern is not reserved for exclusive use as a sync-byte, or if an error occurs in the data-byte. FIG. 1b shows the occurrence of sync-byte emulation 105 in the bitstream. Errors can occur which cause the sync-byte to contain a pattern other than the sync-pattern. FIG. 1b also shows the occurrence of an erroneous sync-byte 106 in the bitstream.

In the absence of another means for determining the start of each packet, the receiving equipment must determine the start by locating the sync-byte. Reliably locating the sync-byte from amongst all the bytes in the bitstream can be a time consuming process, when confronted with sync-byte emulation, and erroneous sync-bytes. FIG. 2 shows a traditional method for discriminating the sync-byte from among the sync-byte emulations. The initial state of the system is termed the "unlock" state, and is shown in FIG. 2a as S0 201. Upon receipt of a byte which contains the sync-pattern, the system enters the synchronizing state, S1 202. If this byte is truly the sync-byte, the next sync-byte will be located one packet length away; in this example, at the byte which is six bytes later in time. The system proceeds to determine if the sync-pattern is found at the byte location which is one packet length away from the previously found sync-pattern. If the sync-pattern is not found at that byte location, the system returns to the S0 state 201. If the sync-pattern is found, the process is repeated and a count of the number of times the system finds the sync-pattern without leaving the S1 state is incremented. If this count is less than some specified number, N, the system remains in the S1 state. If this count becomes equal to N, the system proceeds to the lock state, S2 203.

FIG. 2b shows the operation of the system when the bitstream contains sync bytes 102, sync-byte emulations 105, and erroneous sync-bytes 106. The resultant states, S0 201, S1 202, S2 203, are shown diagrammatically as the system proceeds to process the bitstream to find the sync-byte.

FIG. 3 shows a block diagram for the traditional method, in the more general case. An Input Stream 301 is received by a Data Register 308. The Data Register 308 forms the input into a Data Unit 305, as delineated by the Input Clock 302. The Data Unit 305, or a subset of the Data Unit 305, forms the Compare Unit 305a. Each Compare Unit 305a is compared to the Sync-Pattern 303 by a Comparator 307. A Sync-Pattern-Detected signal 304 is produced by the Comparator 307 to signal a match.

On initialization, the Processor 310 resets the Compare Unit Modulo K Counter 309 and the Match Counter 311 and deasserts the Locked signal 312 and the Start of Packet signal 322. The Compare Unit Modulo K Counter is a modulo counter whose modulus, K, is equal to the number of compare units per packet. The Processor 310 continues to assert the Counter Reset signal 313 until receipt of a Sync-Pattern Detected signal 304, at which time the Compare Unit Modulo K Counter 309 will count the number of Compare Units subsequently received, as delineated by the Compare Clock 306.

Each Compare Unit 305a is compared to the Sync-Pattern 303 by the Comparator 307, which asserts a Sync-Pattern Detected signal 304 whenever the Compare Unit matches the Sync-Pattern, but the Processor 310 takes no action on this signal until the Next Packet signal 316 is received from the Compare Unit Modulo K Counter 309. The Compare Unit Modulo K Counter 309 asserts the Next Packet signal 316 upon every K occurrences of the Compare Clock 306.

If, upon receipt of the Next Packet signal 316, the Sync-Pattern Detector signal 304 is not asserted, the Processor 310 resets the Compare Unit Modulo K Counter 309 and the Match Counter 311. The Processor 310 continues to assert the Counter Reset 313 until the Comparator 307 next asserts the Sync-Pattern Detected signal 304. Upon receipt of the asserted Sync-Pattern Detected signal 304, the Processor 310 deasserts the Counter Reset 313 and waits until the Compare Unit Modulo K Counter 309 reasserts the Next Packet signal 316, and then proceeds as described above.

If, upon receipt of the Next Packet signal 316, the Sync-Pattern Detected signal 304 is asserted, the Processor 310 increments the Match Count 315 contained in the Match Counter 311. If the Match Count 315 is not equal to the specified required count N 308, the Processor 310 waits until the Compare Unit Modulo K Counter 309 reasserts the Next Packet signal 316, and then proceeds as described above.

When the Match Count 315 becomes equal to the specified required count N 308, the Processor 310 asserts the Locked signal 312 and the Start of Packet signal 322. Upon receipt of the asserted Locked signal 312, subsequent processes (not shown) are informed that synchronization has been achieved. The Start of Packet signal 322 delineates the output stream into packets by being asserted at the start of each subsequent packet. Since the Compare Unit Counter commenced counting when the first of this sequence of pattern matches occurred, each subsequent Next Packet signal from this modulo counter will coincide with the start of each subsequent packet. The Start of Packet signal 322 will, therefore, be asserted at each occurrence of the Next Packet signal 316.

The Processor, having achieved Lock state, will continue to assert the Start of Packet signal 322 at the determined start of each packet until it receives a Sync Lost signal 323, indicating that synchronization has been lost and the entire process, as described above, must be repeated. This Sync Lost signal is typically generated from a communications controller, dependent upon information received from this, and other processes. For example, the communications controller may assert this signal upon processor 310 deasserting the Locked signal 312. At each occurrence of the start of packet, as delineated by the Next Packet 316 signal, the Compare Unit should contain the sync-pattern, and the Sync-Pattern Detected 304 signal should be asserted. If it is not asserted, this is an indication of either the loss of synchronization, or an error in the contents of the Compare Unit. The Locked signal 312 is deasserted when M 318 sequential absences of the sync pattern at the start of packet occur. M is chosen to be high enough to minimize the probability that these absences were caused by random errors in the received Compare Units. Typically, M 318 is significantly less than N 308, in the order of 3 to 10. When the Locked signal is deasserted, the processor 310 will typically recommence the synchronization process, described above; alternatively, the aforementioned communications controller, not shown, may assert the Sync Lost signal 323 to force the synchronization process to be repeated.

Note that whenever Locked 312 is deasserted, the subsequent processes (not shown) are inhibited from processing the Output Stream 311. Note also that the entire synchronization process is restarted whenever an erroneous sync-byte is received during the synchronization process, and whenever it is determined, by receipt of a non sync-pattern, that the prior sync-patterns acted upon were sync-byte emulations. The amount of time required to re-establish synchronization, in the presence of sync-byte emulation or erroneous sync-bytes, is non-determinable using this traditional method. Even with reasonable assumptions regarding the likelihood of sync-byte emulation and erroneous sync-bytes, the time required to perform the synchronization process cannot be definitively stated.

Further compounding the required time to achieve synchronization in the traditional method is the choice of N, the number of sequential occurrences of the synchronization pattern required to assert synchronization lock. N is selected to provide sufficient confidence that the determined sync byte location is the true sync byte location, based on the unlikelihood that a data byte would contain N sequential occurrences of the sync-pattern (i.e. N sequential sync-byte emulations). Choosing a high N increases this confidence, but also increases the time and data lost during the synchronization process. Ideally, if, during synchronization, one noted that the sync pattern appeared extremely rarely, it would be reasonable to declare lock as soon as a few sequential occurrences (of this rare event) at one location were noted. If, on the other hand, one noted that the sync pattern appeared very frequently in the input stream during synchronization, it would be reasonable to postpone declaring lock until a significant number of sequential occurrences at one location were noted. Because the actual number of occurrences of sync patterns is unknown at the time the system is designed, N is selected to account for the latter case, and therefore is often set to be much higher than would be necessary if the actual number of occurrences of sync patterns were known. That is, to maximize the likelihood of finding the true sync-byte in the presence of sync-byte emulation and erroneous sync-bytes, the traditional method imposes the worst case requirements on the system, independent of the actual occurrences of sync-byte emulation and erroneous sync-bytes during the synchronization process.

Figure 4:
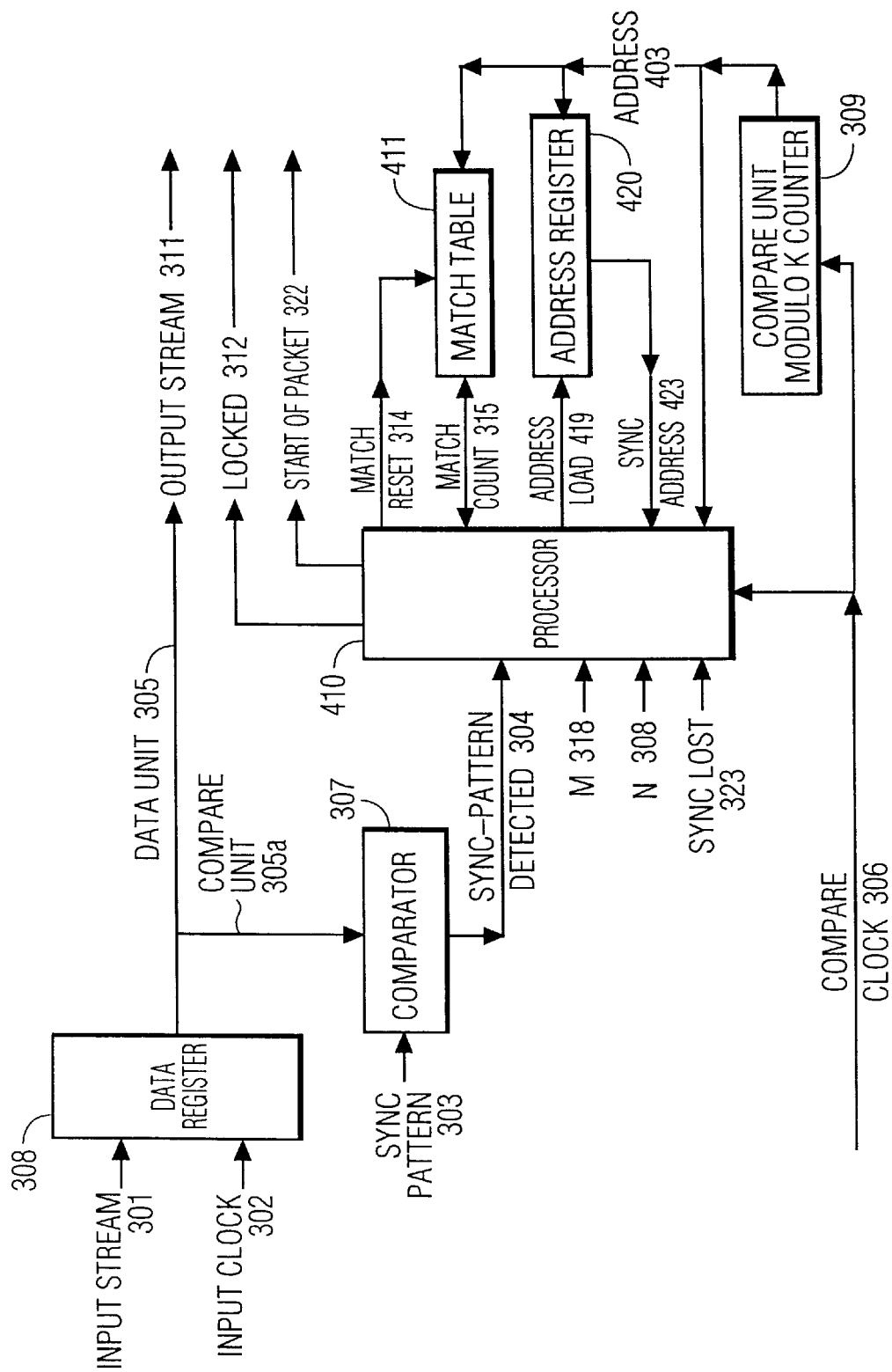
FIG. 4 shows a block diagram of the method of delineating the true sync-byte start of each packet in accordance with this invention.

A preferred embodiment of the present invention is shown in FIG. 4. As shown, the preferred embodiment has similar components to the traditional method. The Input Stream 301 is delineated into Data Units 305, for example bytes, by the Input Clock at the Data Register 308. The Data Unit 305, or a subset of it, forms the Compare Unit 305a. A Comparator 307 compares each Compare Unit 305a with the Sync-Pattern 303, and asserts the Sync-Pattern Detected signal 304 whenever the Compare Unit contains the sync-pattern. The Compare Clock 306 is input to the Compare Unit Modulo K Counter 309, which contains a count of the number of Compare Clock signals received, modulo the number of compare units per packet. As a modulo counter, the count will range from 0 to the number of compare units per packet minus one. The count contained in the Compare Unit Modulo K Counter 309 will be output as the Address 403.

The Match Table 411 consists of K entries, each of which is accessed by the Address 403. That is, the Match Count 315 corresponds to the contents of Match Table 411 at the Address 403 determined by the Compare Unit Modulo K Counter 309. The Processor 410 can read the Match Count 315 from the Match Table 411, and can also modify the Match Count 315 and write it back into the Match Table 411. All such read and write operations only affect the contents of the Match Table 411 at the Address 403 determined by the Compare Unit Modulo K Counter 309.

Upon initialization, the Processor 410 will assert the Match Reset 314 to reset the contents of all entries in the Match Table 411 to zero. It will also deassert the Locked signal 312 and the Start of Packet signal 322.

At each occurrence of the Compare Clock 306, the Processor 410 will increment the Match Count 315 if the Sync-Pattern Detected signal 304 is asserted by the Comparator 307. If the Sync-Pattern Detected signal 304 is not asserted, the Match Count 315 will be reset to zero. The new Match Count 315 will be written to the Match Table 411; the affected entry in the Match Table 411 will be the one addressed by the Address 403 determined by the Compare Unit Modulo K Counter 309. Since the Compare Unit Modulo K Counter 309 has a modulus equal to the number of Compare Units per packet, each Compare Unit within a packet length will have a unique match count, corresponding to a unique Address 403. Thus, each entry of the Match Table 411 will contain a running total of the number of sequential sync-patterns detected at each Compare Unit location within one packet length of the received signal, from the time the Match Table 411 was reset.

As stated above, the Match Count 315 will be reset to zero if the Sync-Pattern Detected signal 304 is not asserted.

Alternatively, the Match Count 315 could be left unmodified, resulting then in the Match Table 411 containing the number of sync-patterns detected, independent of intervening non sync-patterns. This alternative would have significant advantages over the traditional method by minimizing the effect of erroneous sync-bytes. In the traditional method, the synchronization process is repeated in its entirety whenever an erroneous sync-byte is detected; by employing this alternative method, the occurrence of an erroneous sync-byte merely results in one extra packet being required to achieve synchronization.

The Processor 410 will continue to apply the above process for each Compare Unit 305a received, as delineated by the Compare Clock 306, until the Locked signal 312 can be asserted. The Processor 410 will assert the Locked signal 312 in dependence upon the contents of the Match Table 411. A number of alternative algorithms can be employed, as will be later presented. In the simplest embodiment of this invention, corresponding to the traditional method previously discussed, the Locked signal 312 will be asserted whenever the Match Count 315 is equal to N 308. At this same time, the Address Load signal 419 will be asserted to store the current Address 403, i.e. Address Register 420 will contain the Sync Address 423, the address corresponding to the Compare Unit location which achieved the N sequential matches. Thereafter, whenever the Address 403 from the Compare Unit Modulo K Counter 309 equals the Sync Address 423, the Start of Packet signal will be asserted, thereby delineating the Output Stream 311 into packets.

Figure 5:
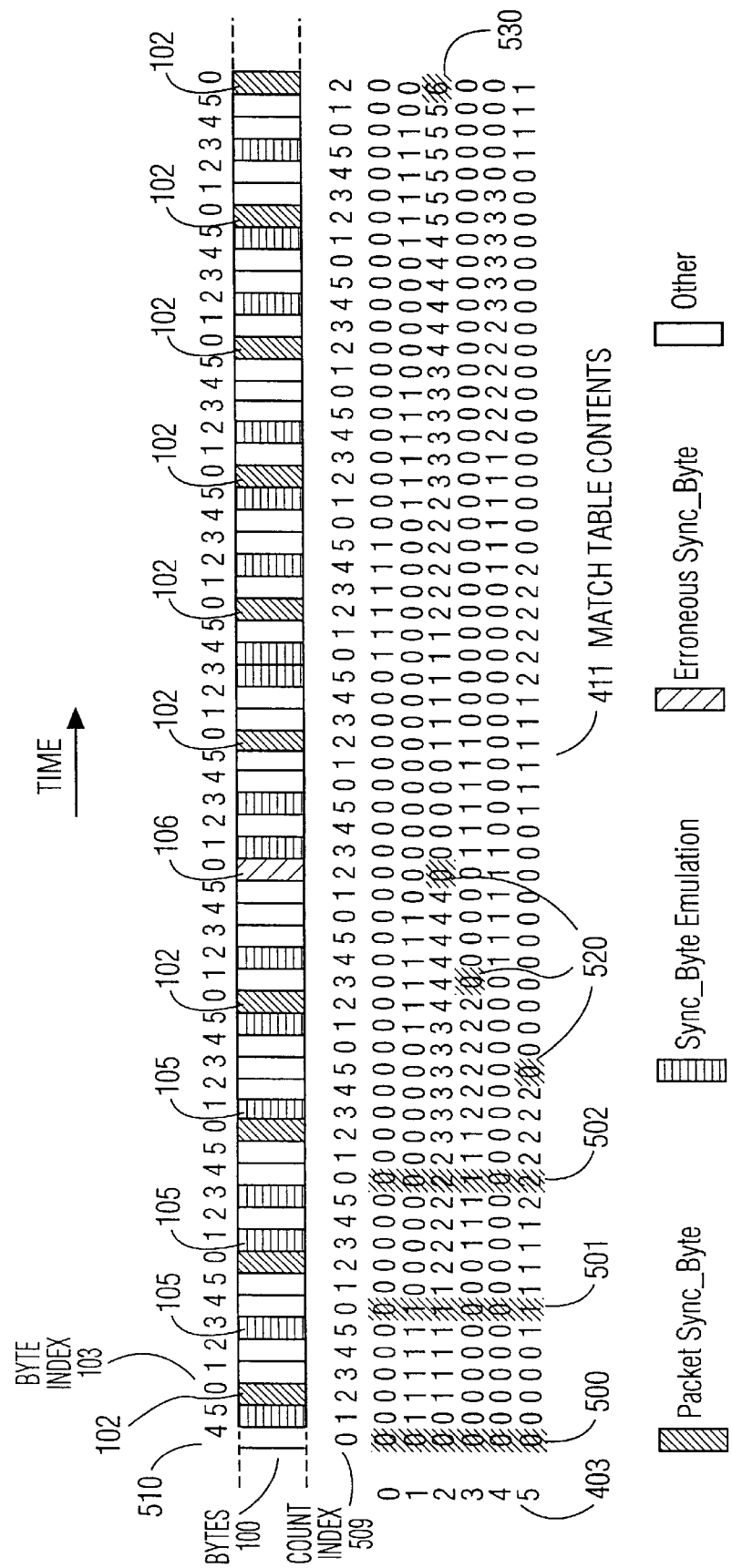
FIG. 5 shows a time sequence demonstrating the processing of a bitstream in accordance with this invention.

FIG. 5 demonstrates the operation of the device for processing of a sync-byte framed bitstream, as described in FIG. 1, supra. The bitstream consists of a series of Bytes 100, including Sync Bytes 102, Sync-byte Emulations 105, and Erroneous Sync-bytes 106. Bytes within a packet are indexed by their packet byte index 103, which is the individual byte's location relative to the preceding sync-byte. Each sync-byte 102 has a byte index of 0. Also shown is an exemplary Count Index 509, which corresponds to the output of the Modulo K counter 309. This Count Index 509 is also used as the index to the Match Table 411, equivalent to the Address 403 in FIG. 4. The contents of the Match Table 411 are shown diagrammatically over time, where time is measured by compare unit intervals. The initial contents of the Match Table 411 are shown at 500; the contents of the Match Table 411 after one packet interval of time are shown at 501; after two packets of time as 502.

The process is shown starting in the middle of a packet, when a byte with a byte index 103 of four is received 510. This byte index of four corresponds to the starting Count Index 509 of zero. Since the Modulo K Counter 309 has the same count length as the packet length, every subsequent occurrence of a byte with an byte index of four will have a corresponding Count Index of zero. Note that before synchronization is achieved, the actual byte index is unknown; the synchronization process is the determination of which count index corresponds to byte index 0, the sync-byte. Thereafter, the start of the packet will be identified to be whenever the count index (corresponding to Address 403 in FIG. 4) is equal to this determined sync-byte index (corresponding to the contents of Address Register 420 in FIG. 4).

At each occurrence of a compare unit which contains the sync-pattern, i.e. a sync-byte or a sync-byte emulation, the contents of the entry corresponding to the count index 509 is incremented. After the receipt of the first six bytes, one packet length, the contents of the Match Table 411 are shown at 501. One sync pattern was detected when the Count Index 509 was one, one sync pattern was detected when the Count Index 509 was two, and one sync pattern was detected when the Count Index 509 was five. At each occurrence of a compare unit which does not contain the sync-pattern, the contents of the entry corresponding to the count index 509 is set to 0 in FIG. 5, as shown at 520. The contents of the Match Table 411 will be updated as shown until one of the match table entries achieve a specified value, N, in this example, six. When an entry in the Match Table achieves the value of six, as shown at 530, the Lock state is asserted, and the count index corresponding to this entry, in this example, a count index of two, is determined to be the sync-byte location within the packet. Thereafter, the packet start is asserted each time the count index is two.

Figure 6:
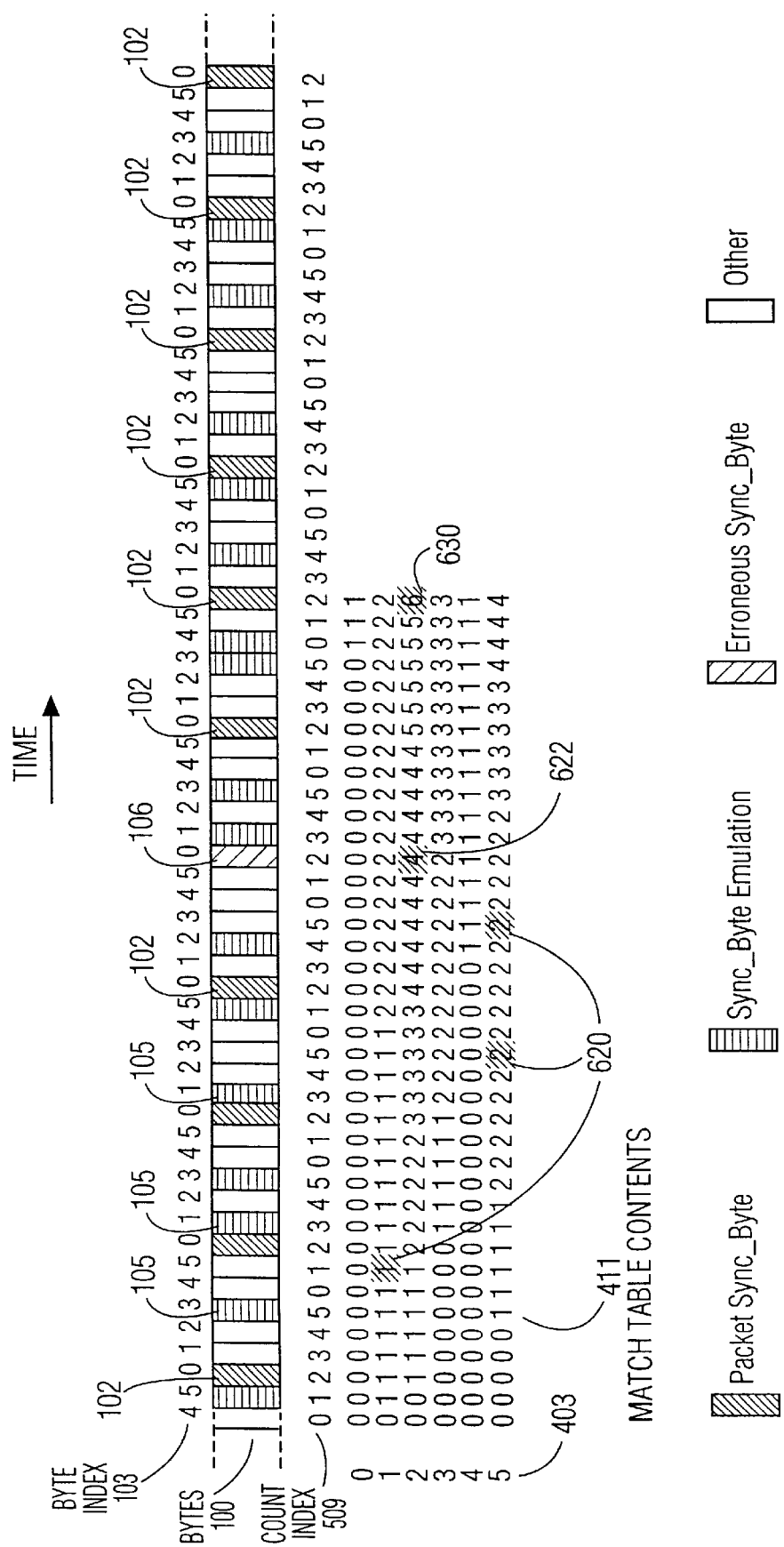
FIG. 6 shows a time sequence demonstrating an alternative algorithm for processing erroneous sync-bytes.

FIG. 6 shows the same bitstream and process, except that the occurrence of a compare unit which does not contain a sync-pattern 620 does not affect the contents of the Match Table 411. As shown, this alternative algorithm can achieve Lock state sooner, as the presence of an erroneous sync byte 106 does not reset the Match Table entry 622 to zero, which thereby allows the Match Table entry corresponding to the sync-byte 630 to achieve the value of six sooner.

Note that the relation of the Data Unit, the Compare Unit, the Compare Clock, and the number of Compare Units per packet are dependent upon the form and format of the incoming Input Stream. In most cases, the Compare Unit will be equal in size to the Data Unit, and the entire Data Unit is compared to the sync pattern. The Compare Clock will be asserted whenever a new unit is available to be compared. If the Input Stream has been delineated into Compare Units by a preceding process, the Compare Clock will mark this delineation. That is, for example, if the Input Stream has been delineated into eight-bit bytes, the Compare Clock will be asserted upon each occurrence of such bytes. In this case, the number of Compare Units per packet would be equal to the number of bytes in the packet. Often, however, the size of the Compare Unit is specified and known, but the starting bit of each Compare Unit is not known. In this case, the Compare Clock 306 would be asserted upon the occurrence of each bit in the Input Stream 301, and the Compare Unit 305a would be formed by the Data Register 308 as a moving window on the Input Stream 301. The size of the window would be the number of bits per Compare Unit, and the Compare Clock would mark the movement of this window by one bit location in the Input Stream. Thus, the number of possible Compare Units per packet would be equal to the number of bits in a packet divided by the number of bits per Compare Clock, in this case one. In this case, then, the number of Compare Units per Packet would equal the number of bits per Packet, independent of the size of the Data Unit or the Compare Unit.

The Comparator 307 will compare the current Compare Unit 305a with the Sync-Pattern 303, and assert the Sync-Pattern Detected signal 304 when there is a match. Note that, in the general case wherein the Compare Clock 306 does not necessarily delineate the start of a Data Unit 305, the comparison will be performed on the aforementioned window of bits in the Input Stream 301 as formed by the Data Register 308. Note also that in the general case, the size of the Data Unit need not be the same as the size of the sync-pattern. The Comparator 307 is designed to compare whichever bits are specified in the format of the communication protocol to the specified sync-pattern. That is, for example, the Data Unit may be specified as a sixteen bit word, while the sync pattern is specified to be located in the last five bits of the first word in the packet. In such a case, the Data Register 308 would be designed to provide a sixteen bit Data Unit 305, and the Comparator 307 would compare the last five bits of the Data Unit 305 with the Sync-Pattern 303, and ignore the other bits in the Data Unit 305. These last five bits of the Data Unit 305 form the Compare Unit 305a. The Sync-Pattern Detected signal 304 would be asserted by the Comparator 307 when the specified bits matched.

It is apparent that this embodiment offers a significant advantage over the traditional method previously described. As described, this embodiment achieves the Lock state in a time equal to or less than the traditional method. If the first Compare Unit which matched the sync-pattern in the traditional method was the true sync-byte, and no erroneous sync-bytes occur, the traditional method and this embodiment will achieve the Lock state in equal time. In all other cases, e.g. wherein the first matched Compare Unit is a sync-byte emulation, the traditional method will require a longer time, and hence discard more data, than this embodiment of the present invention.

Further, this invention can be modified to offer other advantages as well. As will be shown, this method can be parameterized to always result in a locked state upon receipt of N packets. Alternately, it can be parameterized to maximize the likelihood of finding the true sync-byte with minimal synchronization time, in response to the actual occurrences of sync-byte emulation and erroneous sync-bytes during the particular synchronization period. Additionally, this invention can be employed predictively, to begin the synchronization process whenever lack of synchronization is suspected, thereby saving time, and lost data, when resynchronization is required.

A number of alternative algorithms can be employed in the Processor 410 to determine when to assert the Locked 312 and Start of Packet 322 signals, depending upon the criteria required for a particular application. For each of the following algorithmic descriptions, the initial conditions are as follows: the Start of Packet 322, and Locked 312 signals are deasserted, and all entries in the Match Table 411 contain zero. Also, throughout the operation of the algorithm, a change to the Match Count 315 by the Processor 410 will be effected in the entry in the Match Table 411 addressed by the Address 403.

If the criteria for this invention is the ability to achieve reliable synchronization in exactly N packet lengths, a criteria which is infeasible using the traditional method, the operation of Processor 410 can be specified as follows. Upon the occurrence of each Compare Clock 306, the Match Count 315 will be incremented by one if the Sync-Pattern Detected signal is asserted, otherwise the Match Count 315 will remain as is. The Address-Load signal 419 will be asserted whenever the current Match Count is greater than all other Match Counts thus far encountered; in so doing, the Address Register 420 will contain the Address 403 of the entry in the match table 411 which contains the highest number of matches to the sync-pattern thus far. While processing the Nth packet, as measured by the appropriate number of Compare Clock 306 occurrences, the Processor 410 will assert the Start of Packet 322 and the Locked 312 signals when the Address 403 is equal to the Sync-Address 423. That is, the Sync-Address is determined by the location containing the highest number of sync-pattern matches within N packet lengths.

If the criteria for this invention is the ability to reliably achieve synchronization in as few packet lengths as possible, in light of the actual occurrence of sync-byte emulations, the operation of Processor 410 can be specified as follows. Upon the occurrence of each Compare Clock 306, the Match Count 315 will be incremented by one if the Sync-Pattern Detected signal is asserted, otherwise the Match Count 315 will remain as is. The Processor 410 will assert Address-Load signal 419, the Start of Packet 322, and the Locked 312 signals whenever the current Match Count 315 is at least N greater than all other entries in the Match Table 411. In so doing, the Processor 410 will not determine that synchronization has been achieved until the sync-pattern is observed to occur at one location much more often than any other, as measured by N. Thus, in an environment with frequent sync-byte emulations, the synchronization will take longer, but it will result in a more reliable determination that the correct sync-byte has been located than either of the above algorithms or the traditional method. In an environment with infrequent sync-byte emulations, synchronization will be achieved more quickly. Thus, this algorithm can be said to dynamically adjust its synchronization time in response to the occurrence of sync-byte emulations to achieve optimal performance for a given degree of reliability.

Features of these algorithms can be combined. For example, the preceding algorithm was optimized for sync-byte emulations, with little regard to erroneous sync-bytes. This algorithm could be modified to be more sensitive to erroneous sync-bytes, by having it reset the match table entry to zero whenever a non-sync pattern is encountered. In the presence of erroneous sync-bytes, this algorithm would consume more time; but if an erroneous sync-byte does not occur, it would consume significantly less time, because the effects of sync-byte emulations appearing at each other location would be cancelled upon receipt of the next non-sync pattern at that location. In effect, this modified algorithm has as its criteria the occurrence of N more sequential occurrences of the sync pattern at one location than at any other location.

In each of the algorithms, the value N is selected to provide the confidence required to reliably assert the identification of the start of packet in the presence of sync byte emulations and erroneous sync bytes. For the same level of confidence, the N of each algorithm is different than that of the other algorithms, because each algorithm provides a different measure of confidence. For example, the choice of N in the immediately preceding algorithm can be made smaller than the N chosen in the traditional method, yet still achieve the same level of confidence in the resultant determination. This is because the traditional method doesn't consider the information provided by the occurrence or non-occurrence of the sync pattern at the other locations. This is information which conveys confidence that they are not the sync location, which could be used, and is used by this invention, to increase the confidence in the one which is at the true sync location.

The algorithms employed to determine when synchronization is achieved, based upon the histogram of the occurrence and/or non-occurrence of the sync-pattern at all possible sync-byte locations in the packet, as provided for by this invention, is not limited to the above exemplary criteria. The parameter N can be employed in many ways; for example, by requiring that one location be found to contain the sync-pattern N times as often as any other location. Similarly, the Match Table can be used to contain a running average of occurrences of the sync-pattern over a given number of packets, and this average could be used as the criteria for concluding that synchronization has been achieved, as well as determining when synchronization is lost, as will be described below. Any number of statistical tests, based on the frequency of occurrence or non-occurrence of a phenomenon, such as the Binomial Test, the Chi-Square Test, the Sequential Probability Ratio Test, etc. may be used in the current invention for concluding that synchronization has been achieved.

The Processor 410 in FIG. 4 also includes means for determining loss of synchronization. A loss of synchronization is characterized by the location of the sync-byte changing, relative to the location determined when synchronization was established. That is, the receiving system will mistakenly identify a non sync-byte as the sync-byte. This misidentification is avoidable by comparing the contents of the determined sync-byte location to assure that the sync pattern is present. However, the receipt of one sync-byte not containing the sync-pattern is not necessarily sufficient to declare the system out of synchronization or to incur the loss of time and data to reestablish communication. The single missing sync-pattern could have been caused by an erroneous sync byte; that is, the identification of the location of the sync-byte was proper, but the particular sync-byte had erroneous contents. Repeated missing sync-patterns, particularly sequentially, does provide sufficient cause for determining that synchronization has been lost.

Upon synchronization, Sync-Address 423 contains the determined location of the sync-byte. Whenever Address 403 is equal to this Sync-Address 423, the Data Unit 305 should contain the sync-pattern, resulting in the Comparator 307 asserting the Sync-Pattern Detected signal 304. The Processor 410 will initiate a preliminary resynchronization process if the Sync-Pattern Detected signal 304 is not asserted when Address 403 is equal to the Sync-Address 423. In the preferred embodiment, the following algorithm will be employed. Upon occurrence of the first non-match at the Sync-Address, the entire Match Table 411 will be reset to zero, and the Match Count 315 will be incremented to one. For all subsequent occurrences of the Compare Clock 306, the Match Count 315 will be incremented whenever the Sync-Pattern Detected signal 304 is asserted and the Address 403 is not equal to the Sync-Address 423.

If the Sync-Pattern Detected signal 304 is not asserted, the Match Count 315 is either left as is or reset to zero, consistent with the selected synchronization method described above, for those occurrences when the Address 403 is not equal to the Sync-Address 423.

If the Address 403 is equal to the Sync-Address, and the Sync-Pattern Detected signal 304 is not asserted, the Match Count 315 will be incremented. In so doing, the entry in the Match Table 411 at the Address 403 corresponding to the Sync-Address 423 will contain the number of times the determined sync-byte location did not contain the sync-pattern. If this Match Count 315 is equal to M 318, the Processor 410 deasserts the Locked signal 312, and resets the Match Count 315 to zero. The Processor 410 continues to operate as described above until the M non-matches occur, or the resynchronization process is terminated, as discussed below.

If, prior to the occurrence of M non-matches at the sync address location, the Address 403 is equal to the Sync-Address, and the Sync-Pattern Detected signal 304 is asserted, the Processor 410 will terminate this preliminary resynchronization process, and resume its normal operation. It will continue to check for the assertion of the Sync-Pattern Detected signal 304 each subsequent time that the Address 403 is equal to the Sync-Address 423 and reenter this preliminary resynchronization process, as described above.

If M non-matches occur, the Processor reinitializes the synchronization process, with the exception that the entries in the Match Table 411 are not reset to zero. In so doing, the histogram of the occurrences of the sync-pattern at each location during the previous M packets is preserved. The synchronization process will thus require M fewer packets than if the Match Table 411 had been reset to zero.

Figure 7:
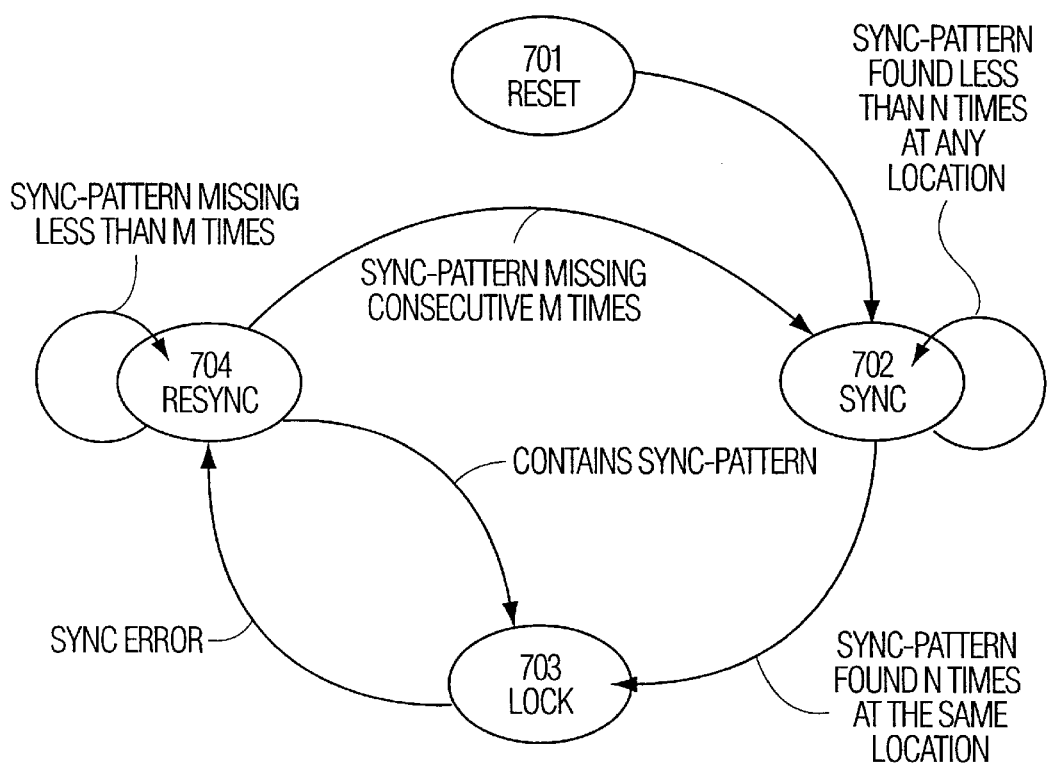
FIG. 7 shows a state diagram of the preferred embodiment of this invention for a communications system.

FIG. 7 shows the State Diagram for the exemplary system. The system initially starts in the Reset State 701. Upon receipt of a Compare Unit, the system enters the Sync State 702, wherein each Compare Unit is compared to the sync-pattern to create a histogram of the occurrence of the sync-pattern at each possible location within one packet length. It remains in this Sync State 702 until the sync-pattern is found at the same location N times, at which time it enters the Lock State 703. The location at which the N occurrences of the sync-pattern were noted is determined to be the sync-byte location. The system remains in the Lock State 703 until a sync error, the occurrence of a non sync-pattern in the determined sync-byte location, is detected, at which time it enters the Resync State 704. In the Resync State 704, each Compare Unit is compared to the sync-pattern to create a histogram of the occurrence of the sync-pattern at each non sync-byte location, and the occurrence of sequential non-sync patterns at the sync-byte location. If the Compare Unit corresponding to the sync-byte location is found to contain the sync-pattern, before M non-sync patterns are found at this location, the system reenters the Lock state. If M sequential non-sync patterns occur at the sync-byte location, the system reenters the Sync state 702, retaining the histogram of sync-pattern occurrences in the non sync-byte locations.

The resynchronization process as described in this invention offers significant advantages to traditional methods. In accordance with this invention, the first occurrence of the absence of the sync-pattern in the sync-byte is used as a predictor that loss of synchronization may be forthcoming. If the sync-pattern is found in a subsequent sync-byte, the prediction is ignored. If, however, it is determined that synchronization has been lost, by the occurrence of M successive absences of the sync-pattern in the sync-byte, the synchronization process is commenced, but the time required to reestablish synchronization will be equivalent to having started the process when the first absence of the sync-pattern was detected.

As with the choice of algorithms for the synchronization process, there are numerous algorithms which can be employed to determine a loss of sync, or a predictor to the loss of sync. For example, the contents of the Match Table may be a running average of the number of occurrences of the sync-pattern at each location over a given number of packets, and the predictor for loss of sync could be the sync-byte location's entry falling below some value, and the loss of sync determination being some other location's entry exceeding the sync-byte location's entry.

It is appreciated by those skilled in the art that this invention could be embodied in software or as a combination of hardware and software. The processor 410 could contain all the elements shown as discrete elements in FIG. 4; a state machine or other controller could perform the operation of the processor; and other such transformations are feasible. The software could be embedded as firmware in a processor, and may a part of a larger system for receiving and processing streams of packets. This software may also be embodied as subroutines, or as a software object, or objects, in an object-oriented framework.

FIGS. 8a–d contains the flowcharts for a preferred embodiment of this invention, wherein each of the processes could be performed by hardware, software, or a combination of both.

Figure 8A:
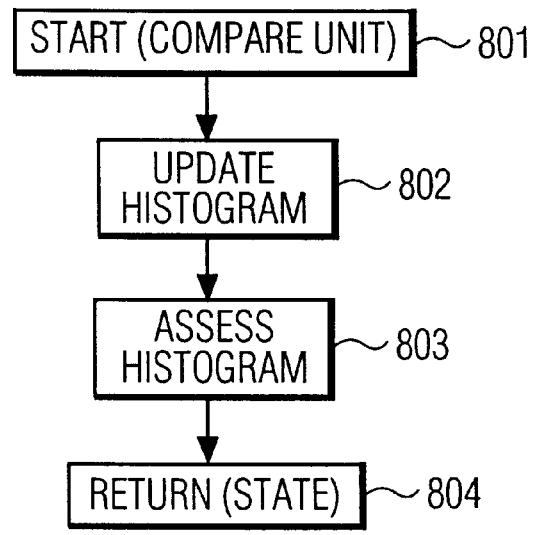
FIGS. 8a–d shows a flow chart of the preferred embodiment of this invention for a communications system.

FIG. 8a shows the overall flow. The process starts 801 with the receipt of a Compare Unit. This may be via an explicit call from a higher level routine; or upon receipt of a message in an event driven or object oriented implementation; or upon the receipt of a clock signal to a hardware element. Upon receipt of the Compare Unit, the histogram is updated 802, and the contents of the histogram are assessed to determine whether sync has been achieved 803. The results of this assessment is returned 804 as the state of the process. The state contains information pertinent to the other parts of the communication system, such as whether sync has been achieved, lost, or suspected, and the location of the sync-byte.

Figure 8B:
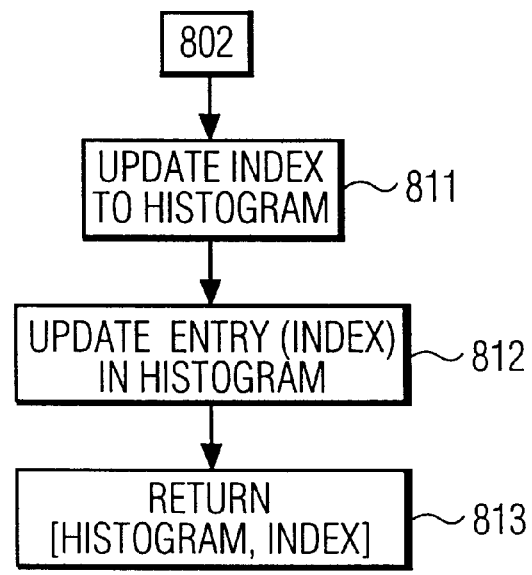

Process 802 is further detailed in FIG. 8b. The index to the histogram is updated 811 by incrementing its prior value by one and resetting it to zero when it equals the number of compare units per packet, i.e. block 811 performs a modulo counter operation. The entry corresponding to this index in the histogram is updated 812 in accordance with the selected algorithm. If the selected algorithm requires the histogram to contain the number of successive occurrences of the sync pattern at this index, the entry will be incremented if the Compare Unit contains the sync pattern and reset to zero if it does not contain the sync pattern. If the selected algorithm requires the histogram to contain the total number of occurrences of the sync pattern, the entry will be incremented if the Compare Unit contains the sync pattern and left as is if it does not. Alternative algorithms, as discussed previously, may require the histogram entry to contain a running average, or other measure associated with the occurrence or non occurrence of the sync pattern, and the process 812 would be modified accordingly. The resultant updated histogram is thereafter returned 813. Note that, consistent with well accepted programming practices, process 802 may also be provided with information concerning the state of the overall process, and the updating processes 811 and 812 may be made to be dependent on such information. In an exemplary system, if the system has achieved locked state, for example, the histogram update process 812 will not change the entries in the histogram. Whereas, if the selected algorithm requires a continuous running average, the histogram update process 812 would continue, even while the system is in the locked state, to compute the average number of occurrences of the sync pattern for each index and change the entries accordingly.

Figure 8C:
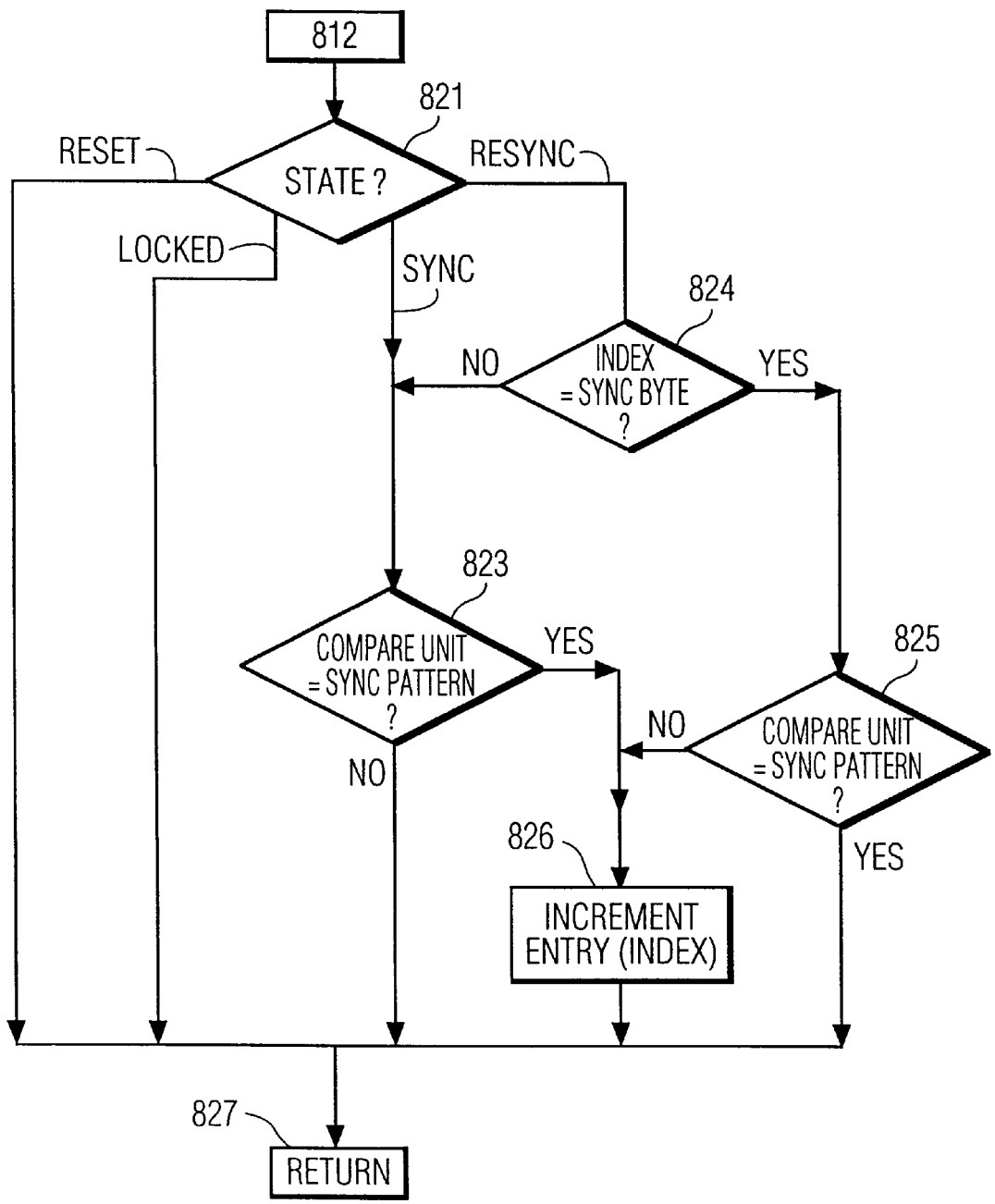
Figure 8D:
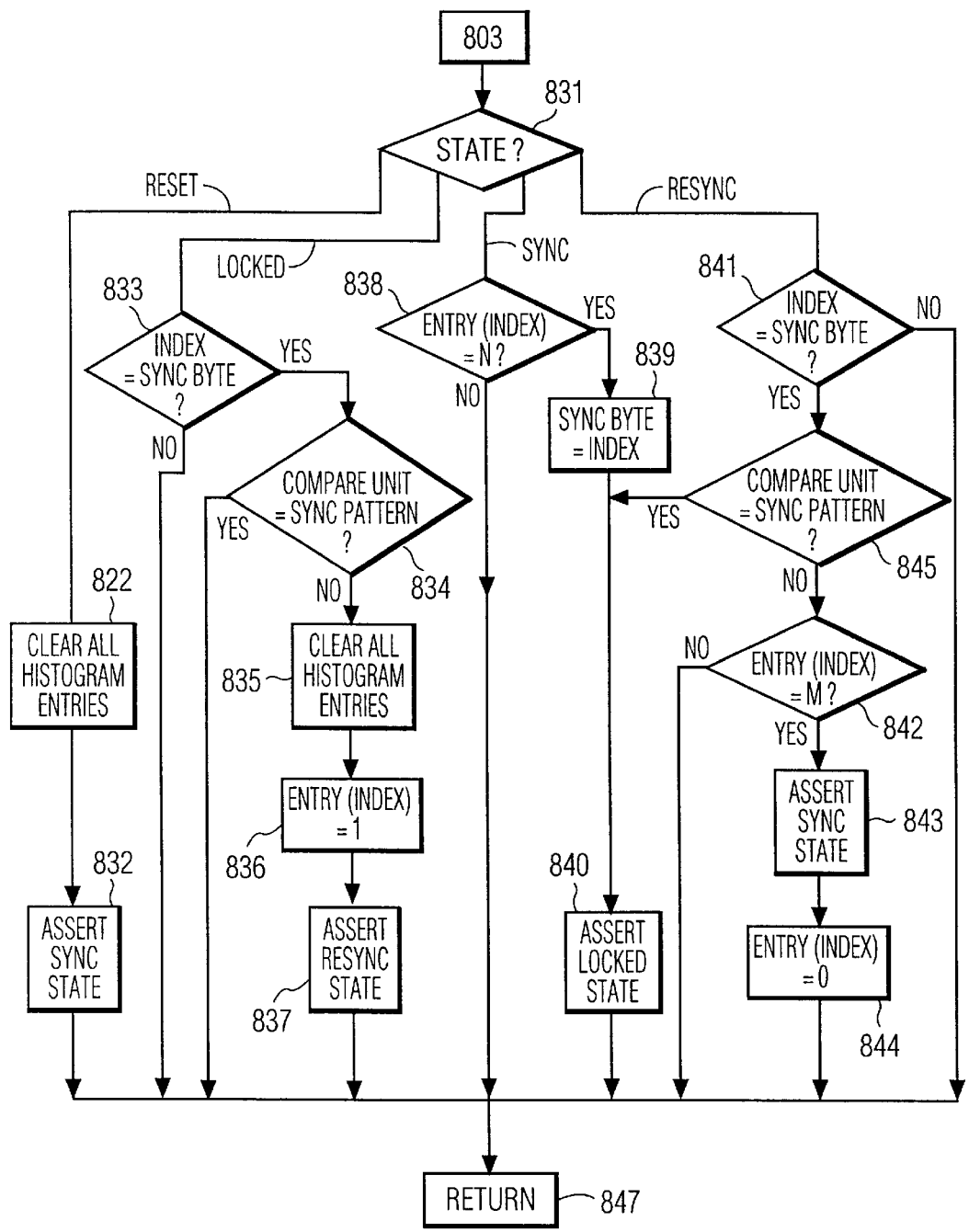

FIG. 8c provides detail for process 812 in the exemplary system. The decision block 821 determines the state of the system. If the state is the sync state, the compare unit is compared to the sync pattern in 823; if the sync pattern is contained in the compare unit, the histogram entry for this index number is incremented by one 826. If the system is in the resync state, the index is compared to that of the sync byte in 824; if it is not the sync byte index, the compare unit is compared to the sync pattern in 823, and the entry is incremented in 826 if the sync pattern is contained in the compare unit. If the index is that of the sync byte, in 824, then the compare unit is compared to the sync pattern in 825, and the entry is incremented in 826 if the sync pattern is not contained in the compare unit. Upon completion of the steps above, the process returns 827.

Process 803 is the embodiment of the algorithm selected to be employed to determine synchronization. An exemplary algorithm is detailed in FIG. 8d. The decision block 831 transfers the control flow depending upon the state of the process. If the state is the reset state, the histogram is cleared in 822, and the state is changed to the sync state in 832. The change of state in 832 then allows the system to begin the synchronization process upon receipt of the next compare unit.

If the state, as determined in 831, is the locked state, the index is compared to the sync byte index in 833. If the index is that of the sync byte, the compare unit is compared to the sync pattern in 834. If the sync pattern is not contained in the compare unit, the preliminary resynchronization process commences: the histogram is cleared 835; the histogram entry corresponding to the sync byte index is set to one 836, indicating one missing sync pattern encountered thus far; and the system state is changed to the resync state 837.

If the state, as determined in 831, is the sync state, the current histogram entry, as indicated by the index, is compared to N in 838. As previously discussed, N is the parameter chosen as the criteria for determining whether synchronization has been achieved. If the criteria has been reached, the index is saved as the sync byte index 839, and the locked state is asserted 840.

If the state, as determined in 831, is the resync state, the index is compared to the sync byte index in 841. If the index is that of the sync byte, the compare unit is compared to the sync pattern in 845. If the compare unit contains the sync pattern, the locked state is reasserted 840. If the compare unit does not contain the sync pattern, the histogram entry at this index is compared to M in 842. As previously discussed, M is the parameter chosen as the criteria for determining that synchronization has been lost. If the criteria has been reached, the sync state is asserted 843, and the histogram entry at this index is reset to zero 844. Note that the other entries in the histogram are not affected, thereby saving the histogram information which was accumulated while in the resync state, which will result in a shorter time spent in the sync state.

Upon completion of the above, the process returns 847.

The above represents the exemplary embodiment. Alternative algorithms can easily be embodied by one skilled in the art. If, as discussed, the criteria requires that the histogram contain the number of sequential occurrences of the sync pattern, a single step which sets the entry to zero can be inserted in the No branch from decision block 823. As another example, the decision block 838 could compare the entry to all other entries in the table, if the algorithm is one which determines that synchronization is achieved whenever one entry exceeds all others by N. Or, decision block 838 could compare the entry to some criteria established through the use of statistical tests, as discussed above. Similarly, the alternative criteria for determining loss of synchronization can be embodied by changing the decision block 842. Note also that a separate variable could have been assigned to contain the number of sequential non sync-patterns occurring at the sync-byte index, for subsequent comparison to M, and the histogram at the sync-byte index could contain the number of sync-patterns occurring, consistent with the other histogram indices.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A device for synchronizing the reception of a series of data packets in a bitstream, each packet having a predetermined length and being delineated by a predefined synchronization pattern therein, said device comprising:

means for accumulating a histogram of occurrences of said synchronization pattern and an indication of a potential erroneous occurrence of said synchronization pattern in advance of an identification of said erroneous occurrence at corresponding locations in each of successive packets;

and means for identifying the start of subsequent packets depending upon said histogram.

2. A device for synchronizing the reception of a series of data packets in a bitstream in accordance with claim 1, where said accumulating means comprises:

means for delineating successive groups of bits within each packet and in which the synchronization pattern may be located;

means for identifying each of said groups of bits by a respective group index;

and means for accumulating a count of the number of times said synchronization pattern appeared in each of the indexed groups within the successive packets.

3. A device for synchronizing the reception of a series of data packets in a bitstream in accordance with claim 1, where said accumulating means comprises:

means for delineating successive groups of bits within each packet and in which the synchronization pattern may be located;

means for identifying each of said groups of bits by a respective group index;

and means for accumulating a count of the number of times said synchronization pattern appeared sequentially in each of the indexed groups within successive packets.

4. A device for synchronizing the reception of a series of data packets in a bitstream in accordance with claim 1, where said means for identifying the start of subsequent packets comprises means for delineating successive groups of bits within each packet in which the synchronization pattern may appear;

means for identifying each of said groups of bits by a respective group index;

and means for identifying, based on said histogram, a sync-byte index as one of said group indices;

wherein the start of each packet is identified by each occurrence of the groups of bits whose group index is equal to the sync-byte index.

5. A device for synchronizing the reception of a series of data packets in a bitstream in accordance with claim 4, wherein said means to identify a sync-byte index identifies the group index at which a specified number of occurrences of said synchronization pattern is accumulated in said histogram.

6. A device for synchronizing the reception of a series of data packets in a bitstream in accordance with claim 4, wherein said means to identify a sync-byte index identifies the group index at which a specified number of sequential occurrences of said synchronization pattern is accumulated in said histogram.

7. A device for synchronizing the reception of a series of data packets in a bitstream in accordance with claim 4, wherein said means to identify a sync-byte index identifies the group index at which the largest number of occurrences of said synchronization pattern is accumulated in said histogram.

8. A device for synchronizing the reception of a series of data packets in a bitstream in accordance with claim 4, wherein said means to identify a sync-byte index identifies the group index at which the number of occurrences of said synchronization pattern is distinguishable from the number of occurrences thereof at any other group index in said histogram.

9. A device for synchronizing the reception of a series of data packets in a bitstream in accordance with claim 4, wherein said means to identify a sync-byte index performs a statistical test on the contents of said histogram.

10. A device for synchronizing the reception of a series of data packets in a bitstream in accordance with claim 4, wherein said means to identify a sync-byte index identifies the group index at which the number of occurrences of said synchronization pattern is substantially larger than the number of occurrences thereof at any other group index in said histogram.

11. A method for synchronizing the reception of a series of data packets in a bitstream, each packet having a predetermined length and being delineated by a predefined synchronization pattern therein, said method comprising the steps of:

accumulating a histogram of occurrences of said synchronization pattern and an indication of a potential erroneous occurrence of said synchronization pattern in advance of an identification of said erroneous occurrence of said synchronization pattern at corresponding locations in successive packets; and, identifying the start of subsequent packets depending upon said histogram.

12. A method for synchronizing the reception of a series of data packets in a bitstream in accordance with claim 11, where said accumulating step comprises the steps of:

delineating successive groups of bits within each packet in which the synchronization pattern may appear;

identifying each of said groups of bits by a respective group index; and, accumulating a count of the number of times said synchronization pattern appeared in each of the indexed groups within successive packets.

13. A method for synchronizing the reception of a series of data packets in a bitstream in accordance with claim 11, where said accumulating comprises the steps of:

delineating successive groups of bits within each packet in which the synchronization pattern may be located;

identifying each of said groups of bits by a respective group index; and, accumulating a count of the number of times said synchronization pattern appeared sequentially in each of the indexed groups within successive packets.

14. A method for synchronizing the reception of a series of data packets in a bitstream in accordance with claim 11, where identifying the start of subsequent packets comprises the steps of:

delineating successive groups of bits within each packet in which the synchronization pattern may appear;

identifying each of said groups of bits by a respective group index; and identifying a sync-byte index as one of said group indices based upon the contents of said histogram;

the start of each packet being identified by each occurrence of the group of bits having a group index equal to the sync-byte index.

15. A method for synchronizing the reception of a series of data packets in a bitstream in accordance with claim 14, wherein said identification of a sync-byte index comprises identification of the group index at which a specified number of occurrences of said synchronization pattern is accumulated in said histogram.

16. A method for synchronizing the reception of a series of data packets in a bitstream in accordance with claim 14, wherein said identification of a sync-byte index comprises identification of the group index at which a specified number of sequential occurrences of said synchronization pattern is accumulated in said histogram.

17. A method for synchronizing the reception of a series of data packets in a bitstream in accordance with claim 14, wherein said identification of a sync-byte index comprises identification of the group index at which the largest number of occurrences of said synchronization pattern is accumulated in said histogram.

18. A method for synchronizing the reception of a series of data packets in a bitstream in accordance with claim 14, wherein said identification of a sync-byte index comprises identification of the group index at which the number of occurrences of said synchronization pattern is distinguishable from the number of occurrences thereof at any other group index in said histogram.

19. A device for synchronizing the reception of a series of data packets in a bitstream in accordance with claim 14, wherein said identification of a sync-byte index comprises a statistical test on the contents of said histogram.

20. A method for synchronizing the reception of a series of data packets in a bitstream in accordance with claim 14, wherein said identification of a sync-byte index comprises identification of the group index at which the number of occurrences of said synchronization pattern is substantially larger than the number of occurrences thereof at any other group index in said histogram.

21. A device for synchronizing the reception of a series of data packets in a bitstream, each packet having a predetermined length and being delineated by a predefined synchronization pattern therein, said device comprising:

means for accumulating a histogram of occurrences of said synchronization pattern and an indication of a potential erroneous occurrence of said synchronization pattern in advance of an identification of said erroneous occurrence at corresponding locations in each of successive packets, means for delineating data units within each of said packets, means for generating an index for counting each delineated data unit within each of said packets, said index being incremented by one upon receipt of each said data unit and being reset to zero upon receipt of a number of data units corresponding to said predetermined length of each of said packets, means for storing a set of match counts respectively corresponding to each data unit within said packets, means for comparing each of said data units with said synchronization pattern, means for incrementing a corresponding match count in said set of match counts when said comparison determines that said synchronization pattern is located within the corresponding data unit and, means for signalling a lock state when the value of one match count conforms to predetermined criteria based on a histogram of said match counts.

22. A device as in claim 21, wherein said device further comprises:

means for determining a sync index when the values of one or more of said match counts conform to other predetermined criteria based on said histogram.

23. A device as in claim 22, wherein said device further comprises:

means for asserting a start of a packet signal whenever the index of a delineated data unit is equal to the said sync index.

24. A device as in claim 21, wherein said device further comprises:

means for setting the match count of an index to zero when said comparison determines that said synchronization pattern is not located within the data unit corresponding to said index.

25. A method for detecting a loss of synchronization in the reception of a series of data packets in a bitstream, said data packets each having a predetermined length being delineated by a predefined synchronization pattern, and said delineation being marked by a start of packet signal, said method comprising the steps of:

accumulating a histogram of occurrences of said synchronization pattern within said packets and an indication of a potential erroneous occurrence of said start of packet signal both the occurrences and the indication being accumulated in advance of an identification of said erroneous occurrence; and identifying the erroneous occurrence of said start of packet signal depending upon said histogram.

26. A method as in claim 25, further comprising the step of:

providing said histogram of occurrences of said synchronization patterns for use in a subsequent synchronization process.

27. A device for synchronizing the reception of a series of packets in a bitstream, each packet having a predetermined length and being delineated by a predefined synchronization pattern included therein, said device comprising:

means for accumulating a histogram of occurrences and non-occurrences of said synchronization pattern at corresponding locations in each of successive packets;

means for identifying the start of subsequent packets depending upon said histogram; and, means for identifying an erroneous identification of said start of subsequent packets depending upon said histogram.

* * * * *